United States Patent [19]

Kuo

[11] Patent Number: 5,690,192

[45] Date of Patent: Nov. 25, 1997

[54] BRAKE MEANS FOR A BICYCLE

[76] Inventor: Yung-Pin Kuo, No. 55, Alley 121, Lane 175, Kuo Shen Rd., Chang Hwa City, Taiwan

[21] Appl. No.: 654,118

[22] Filed: May 28, 1996

[51] Int. Cl.⁶ .............................. B62L 3/00; B60T 11/00
[52] U.S. Cl. .................... 188/24.22; 188/344; 188/72.4
[58] Field of Search .................... 188/24.22, 24.12, 188/24.14, 24.15, 344, 72.4

[56] References Cited

U.S. PATENT DOCUMENTS

| 4,257,496 | 3/1981 | Fujita et al. ................ 188/344 X |
| 4,391,353 | 7/1983 | Mathauser ................ 188/24.22 X |
| 4,585,094 | 4/1986 | Rottenkolber et al. ......... 188/24.22 |
| 5,390,771 | 2/1995 | Hinkens et al. .............. 188/24.12 X |

Primary Examiner—Peter M. Poon
Attorney, Agent, or Firm—Bacon & Thomas

[57] ABSTRACT

A brake device for a bicycle includes a control portion disposed to a front fork of the bicycle, the control portion having a bottom with a tubular element extending therefrom and a first piston received therein with a first resilient element disposed between the first piston and the bottom, hydraulic liquid received between the first piston and the bottom, two pipes respectively communicated with a space filled with hydraulic liquid and connected to a corresponding brake part disposed at the front fork, an actuating device slidably received in the control portion and operated by the brake cable so as to push the first piston toward the bottoms the brake part having a second piston received therein with a rod extending therefrom which has a brake pad disposed at a distal end thereof, a board received in the brake part and the rod extending therethrough, a second resilient element disposed between the second piston and the board such that when the brake cable is pulled to push the first piston to pressurize the hydraulic liquid into the brake part, the second piston and the brake pad are pushed to stop the bicycle.

4 Claims, 7 Drawing Sheets 5,690,192

BRAKE MEANS FOR A BICYCLE

BACKGROUND OF THE INVENTION

1. Field of the Invention

The present invention relates to a brake means and note particularly, to a hydraulic brake means to effectively stop the bicycle.

2. Brief Description of the Prior Art

A conventional brake means of a bicycle includes two brake arms respectively pivotally disposed to both sides of the wheel on the front folk, each of the brake arms having a brake pad disposed thereto and operated by a brake cable connected to the handlebar such that when the brake cable is pulled by the rider, the brake arm connected to the brake cable is pivoted and the brake pad connected to the brake arm contacts the rim of the wheel to stop the rotation of the wheel. Such a brake means provides only a limited force on each of the brake pads and the brake cables could be broken off if a sudden and large force is exerted to the brake cables. Furthermore, there in very little flexibility when pulling the brake cables A sudden impact therefore, happens between the brake pads and the rim of the wheel to be stopped and this brings a bad feel to the rider.

The present invention intends to provide a brake means which is operated by a hydraulic means cooperated therewith so as to mitigate and/or obviate the above-mentioned problems.

SUMMARY OF THE INVENTION

The present invention provides a brake means for a bicycle and comprises a bridge element disposed on the front fork, a control portion disposed to the bridge element and being a cylindrical element with a first end and a second end with a bottom from which a tubular element extends longitudinally and an oil hole and two first holes respectively defined in a periphery of the control portion near the second end. Each of the two first holes is connected with a pipe respectively and a nut is engaged with the oil hole. A first piston is movably received in the control portion and has a disk from one side of which a stud extends. The stud is received in the tubular element and a first resilient element is located between the bottom and the disk. Hydraulic liquid is received between the disk and the bottom.

An actuating means is movably disposed in the control portion and is located to the other side of the disk, the actuating means connected to the brake cable and pushing the piston element toward the tubular element to pressurize the hydraulic liquid when the brake cable is pulled.

A brake part is disposed on the front fork and has a first end connected to the pipe and a second end with a board i received therein. A second piston is slidably received in the brake part with a rod extending from a first end thereof, the rod extending through the board and having a brake pad disposed at a distal end thereof. A second resilient element is biasedly disposed between the board and the second piston such that when hydraulic liquid enters into the brake part via the pipes the second piston together with the rod are pushed to let the brake pad extend out the second end of the brake part.

It is an object of the present invention to provide a brake means using hydraulic force to stop a bicycle.

It is another object of the present invention to provide a brake means using hydraulic force and the brake means is actuated by brake cables.

Other objects, advantages: and novel features of the invention will become more apparent from the following detailed description when taken in conjunction with the accompanying drawings.

DETAILED DESCRIPTION OF TEE PREFERRED EMBODIMENTS

Figure 1:
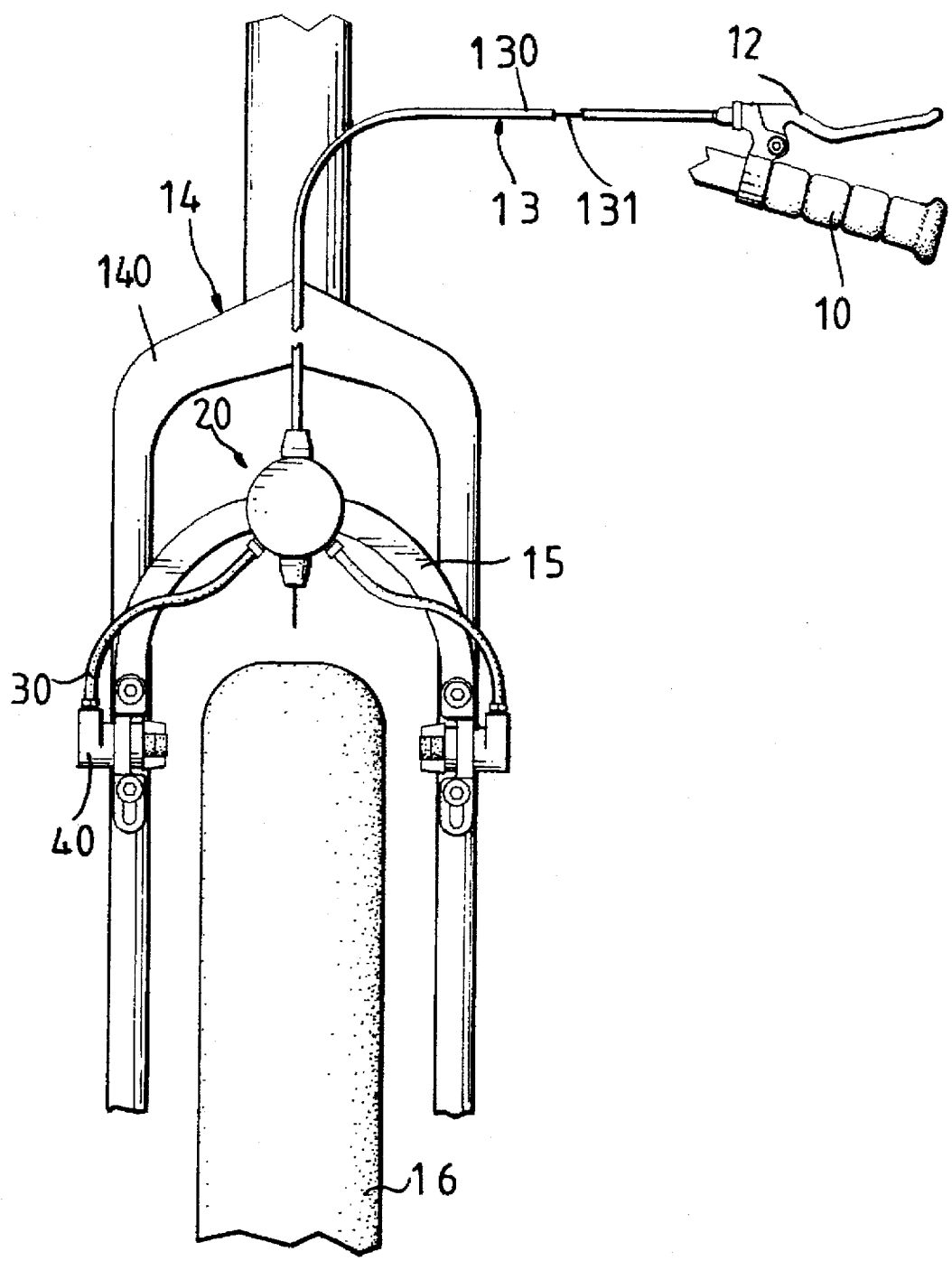
FIG. 1 is an illustrative view of a brake means disposed to a bicycle in accordance with the present invention.
Figure 2:
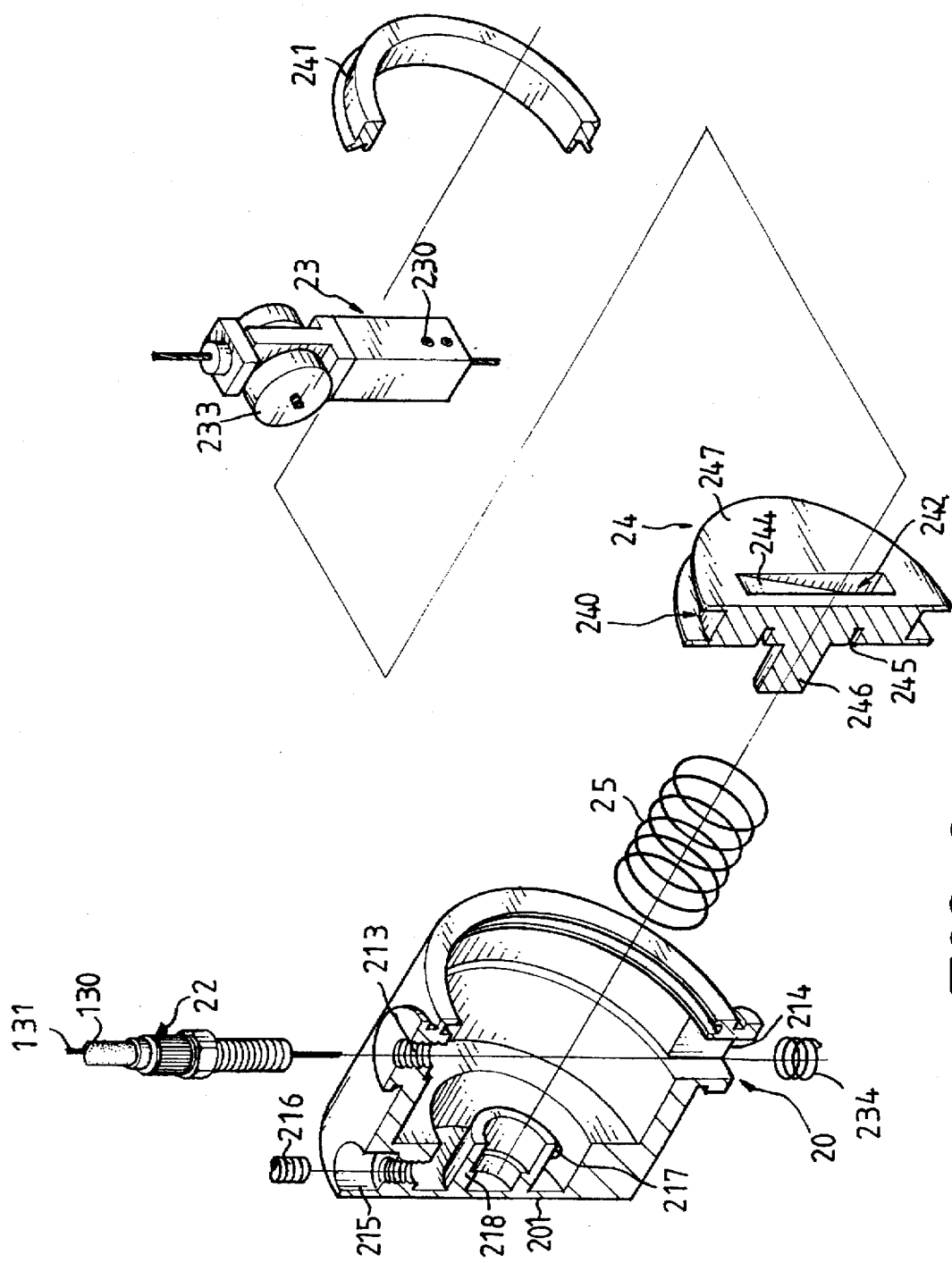
FIG. 2 is an exploded view of the control portion and the actuating means of the brake means in accordance with the present invention.
Figure 3:
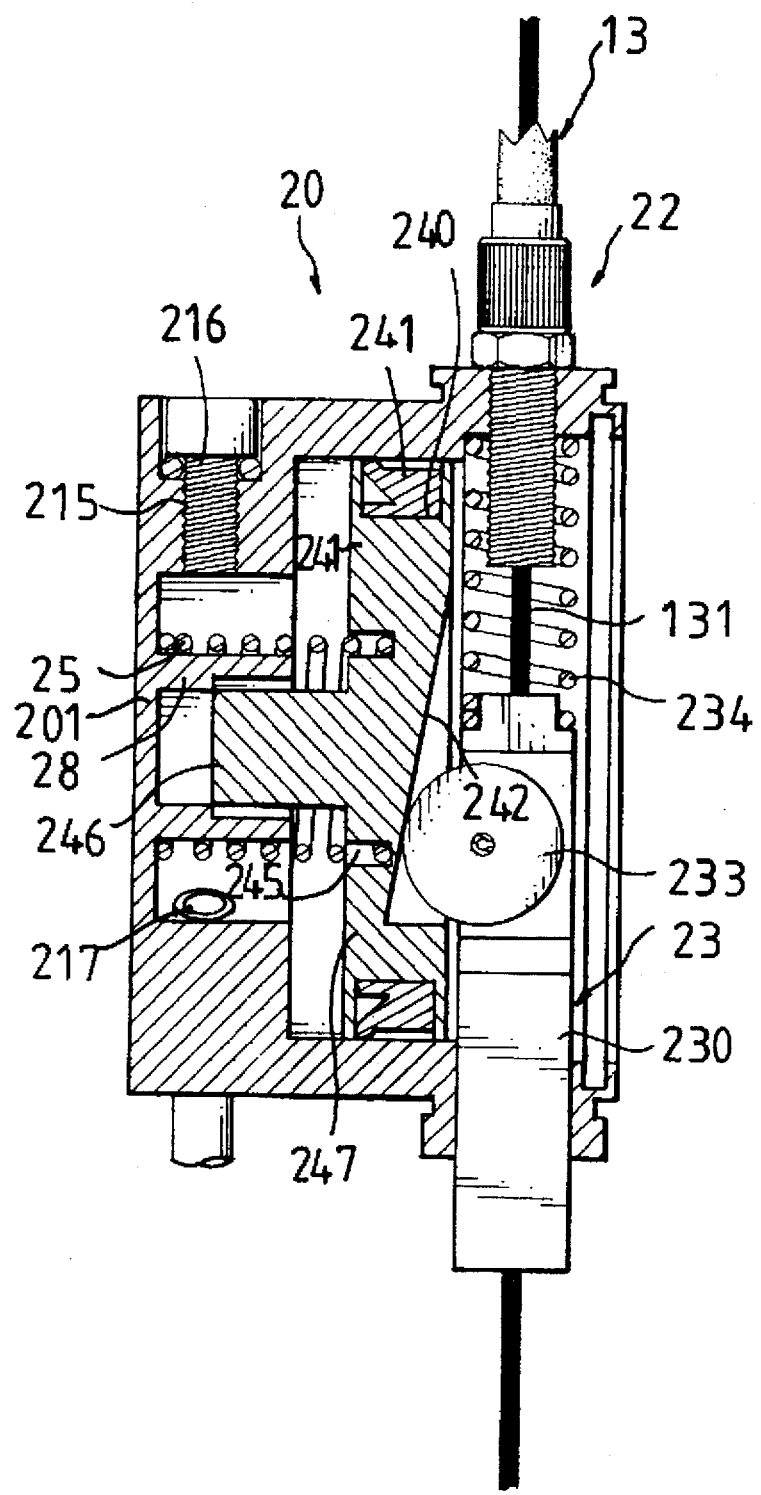
FIG. 3 is a side elevational views partly in sections of the engagement of the control portion and the actuating means in accordance with the present invention.
Figure 4:
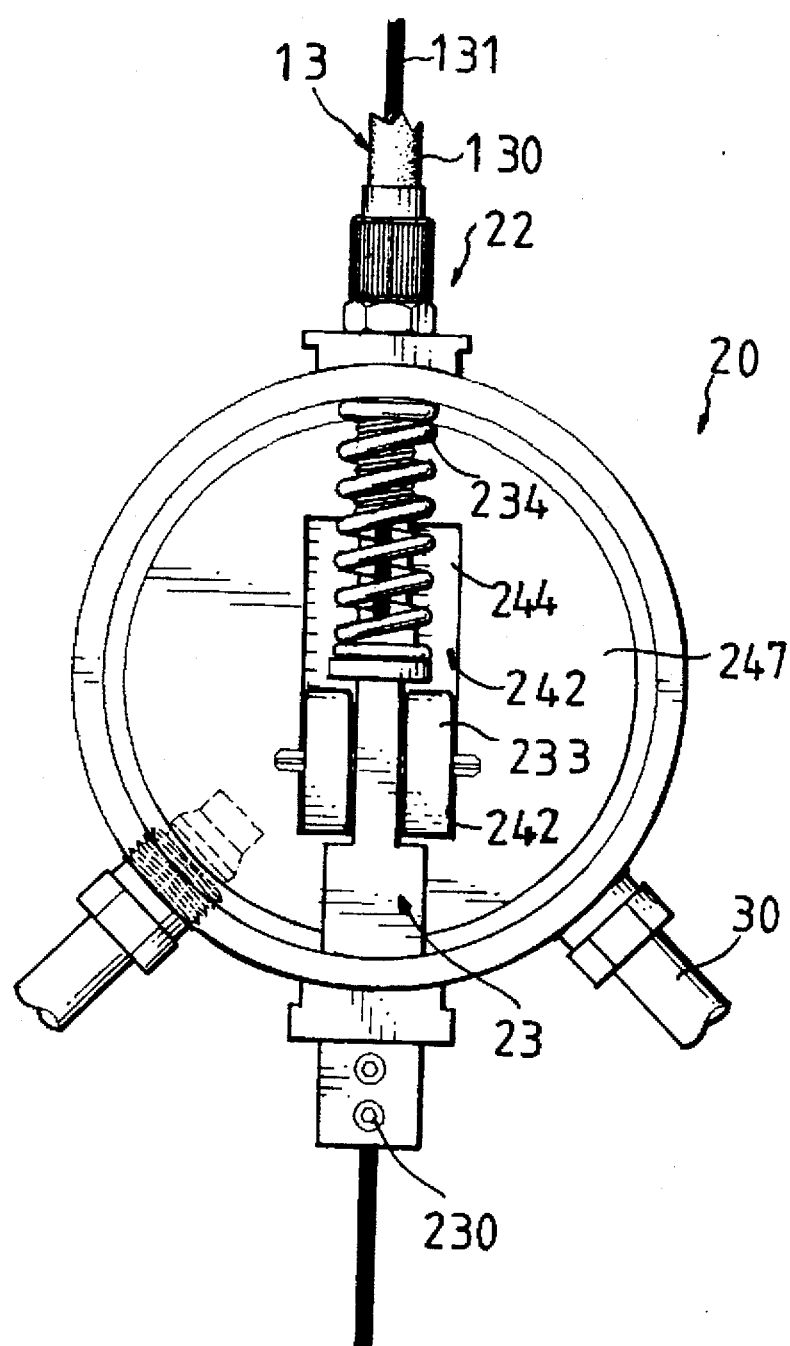
FIG. 4 is a front end plan view of the engagement as shown in FIG. 3.

Referring to the drawings and initially to FIGS. 1 through 4, a bicycle generally comprises a front fork 14 and a handlebar 10 disposed above the front fork 14 comprising two legs 140. At least one brake lever 12 is connected to one of two ends of the handlebar 10 and a brake cable 13 is connected at a first end thereof to the brake lever 12, a second end of the brake cable 13 connected to a brake means in accordance with the present invention which generally includes a bridge element 15 disposed between the two legs 140 of the front fork 14, a control portion 20 disposed on the bridge element 15 and being a cylindrical element with a first end and a second end with a bottom 201. A tubular element 218 extends longitudinally from the bottom 201 and an oil hole 215 and two first holes 217 respectively defined in a periphery of the control portion 20 near the second end. Each of the two first holes 217 is connected with a pipe 30 respectively and a threaded rod 216 is engaged with the oil hole 215. A first piston 24 is movably received in the control portion 20 and has a disk 247 from which a stud 246 extends from one side of the disk 247. The stud 246 is received in the tubular element 218 and the disk 247 has an annular groove 245 defined therein around the stud 246 for a first resilient element 25 being biasedly disposed between the bottom 201 and the annular groove 245 of the disk 247. Hydraulic liquid (not shown) is received between the disk 247 and the bottom 201. The disk 247 has a groove 240 defined in a periphery thereof for a seal 241 received therein to prevent the hydraulic liquid from leaking. The disk 247 has a notch 242 defined in the side opposite to the stud 246 and the notch has an inclined bottom 244 which has a first end with a deep depth to a surface of the side of the disk 247 and a second end with a shallow depth to the surface of the side.

Figure 5:
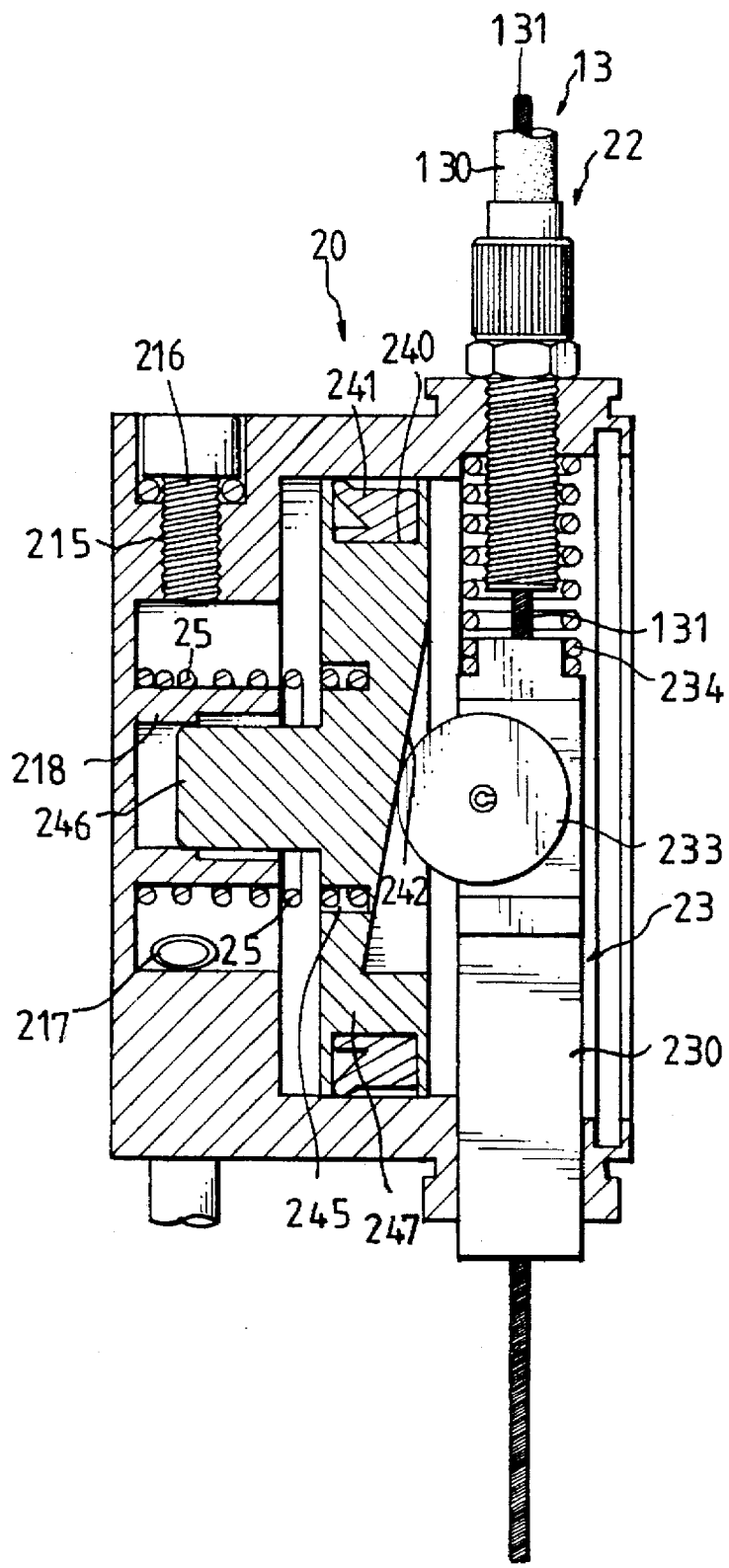
FIG. 5 is a side elevational view similar to that shown in FIG. 3 wherein the movable element is moved upwardly to push the first piston toward the bottom of the control portion.

The control portion 20 has a second hole 213 and a third hole 214 defined diametrically in the periphery thereof near the first end of the control portion 20. An actuating means movably disposed in the control portion 20 and located to the other side of the disk 247 opposite to the stud 246. The actuating means comprises a stationary element 22 threadedly fixedly disposed in the second hole 213 and a movable element 23 received beneath the stationary element 22 via the third hole 214 with a third resilient element 234 disposed between the stationary element 22 and the movable element 23. A sheath 130 of the brake cable 13 is ended at the stationary element 22 and the brake core 131 extends through the stationary element 22 and is fixedly connected to the movable element 23 by two threaded rods 230. The movable element 23 has two rollers 233 rotatably disposed thereto so as to be engaged with the notch 242 such that when the brake cable 13 is pulled, as shown in FIG. 5, the movable element 23 is moved and the rollers 233 roll on the inclined bottom 244 from the first end to the second end so as to push the first piston 24 toward the bottom 201 of the control portion 20 to pressurize the hydraulic liquid received between the disk 247 and the bottom 201.

Figure 6:
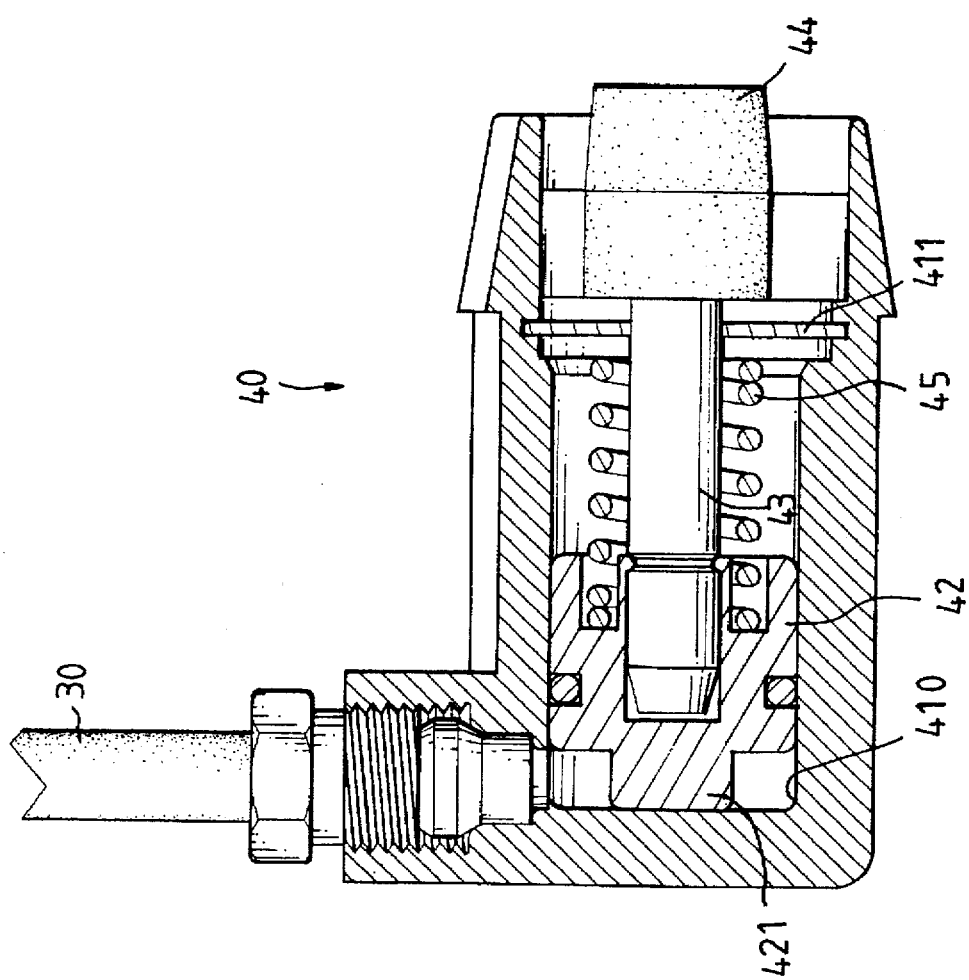
FIG. 6 is a side elevational view partly in sections of the brake part.

Referring to FIG. 6, a brake part 40 is disposed to each one of two legs 140 of the front fork 14 and is located on each of two sides of a wheel 16. The brake part 40 has a first end connected to the pipe 30 and a second end with a board 411 received therein toward the wheel 16. A second piston 42 is slidably received in the brake part 40 with a rod 43 securely disposed to a first end thereof, the rod 43 extending through the board 411 and having a brake pad 44 disposed at a distal end thereof. A second resilient element 45 is biasedly disposed between the board 411 and the second piston 42. A protrusion 421 extends from a second end of the second piston 42 and contacts an inner wall of the brake part so as to define an annular space between the second end of the second piston 42 and the inner wall of the brake part 40 to receive hydraulic liquid entering from the pipe 30 such that when hydraulic liquid enters into the annular space via the pipe 30, the second piston 42 together with the rod 43 are pushed to let the brake pad 44 extend out of the second end of the brake part 40 to stop the wheel 16.

Accordingly, the brake means provides a stable and sufficient force to stop the bicycle and is operated by grasping a conventional brake lever 12. A slight compressibility of a smooth hydraulic liquid provides the braking effect.

Figure 7:
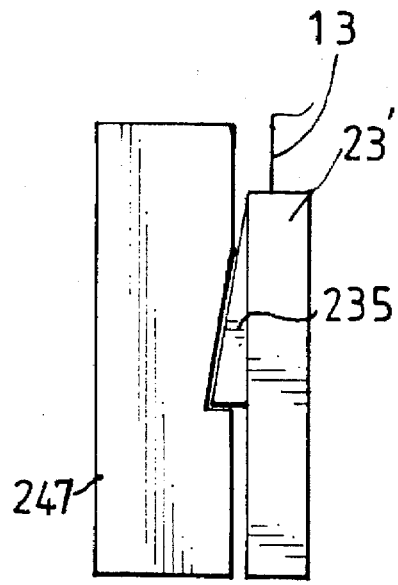
FIG. 7 is an illustrative view to show another embodiment of the actuating means.

An embodiment of the actuating means shown in FIG. 7 wherein the rollers 233 are replaced by a wedge portion 235 which extends from the movable element 23' and is received in the notch 242, the wedge portion 235 having an inclined upper surface contacting the inclined bottom 244 of the notch such that when the brake cable 13 connected to the movable element 23' is moved upwardly, the wedge portion 235 pushes the first piston 24 toward the bottom 201 of the control portion 20.

Figure 8:
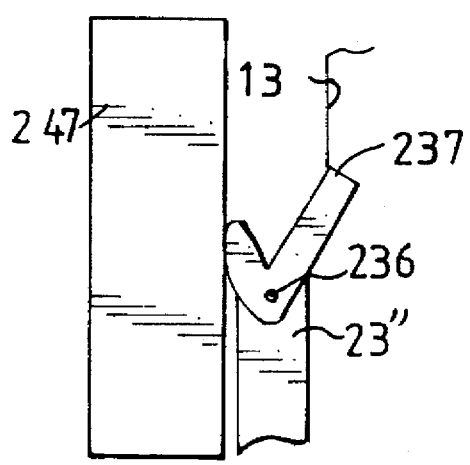
FIG. 8 is an illustrative view to show yet another embodiment of the actuating means.

FIG. 8 shows another embodiment of the actuating means wherein the movable element 23" has a V-shaped rock arm 237 pivotally disposed to a top thereof at point 236, the brake cable 131 connected to one of two distal ends of the rock arm 237 such that when the brake cable 13 is pulled upwardly, the other distal end of the rock arm 237 pushes the first piston 24.

Although the invention has been explained in relation to its preferred embodiment, it is to be understood that many other possible modifications and variations can be made without departing from the spirit and scope of the invention as hereinafter claimed.

What is claimed is:

1. A brake means for a bicycle which comprises a front fork and a handlebar disposed above said front fork comprising two legs, at least one brake lever disposed to one of two ends of said handlebar and a brake cable connected at a first end thereof to said brake lever, a second end of said brake cable connected to said brake means which comprises:

a bridge element disposed between said two legs of said front forks a control portion disposed on said bridge element and being a cylindrical element with a first end and a second end which has a bottoms a tubular element extending longitudinally from said bottom and an oil hole and two first holes respectively defined in a periphery of said control portion near said second end, each of said two first holes connected with a pipe respectively and a threaded rod engaged with said oil holes a first piston slidably received in said control portion and comprising a disk and a stud which extends from one side of said disks said stud received in said tubular element and a first resilient element biasedly disposed between said bottom and said disks said disk and said bottom having hydraulic liquid filled therebetween;

an actuating means movably disposed in said control portion and located to the other side of said disks said actuating means connected to said second end of said brake cable and contacting said first pistons said first piston being pushed toward said tubular element to pressurize said hydraulic liquid received between said disk and said bottom when said brake cable is pulled, and a brake part disposed to each of two legs of said front fork and having a first end connected to said pipe and a second end with a board received therein, a second piston slidably received in said brake part with a rod extending from a first end thereof, said rod extending through said board and having a brake pad disposed at a distal end thereof, a second resilient element biasedly disposed between said board and said second piston such that when said hydraulic liquid enters into said brake part via said pipe, said second piston together with said rod are pushed to let said brake pad extend out said second end of said brake part.

2. The brake means as claimed in claim 1 wherein said disk has a notch defined in said side opposite to said stud and said notch has an inclined bottom which has a first end with a deep depth and a second end with a shallow depth; said control portion having a second hole and a third hole defined diametrically in said periphery thereof near said first end of said control portions said actuating means comprising a stationary element fixedly disposed in said second hole and a movable element received beneath said stationary element via said third hole with a third resilient element disposed between said stationary element and said movable element, said brake cable extending through said stationary element and connected to said movable element, said movable element having at least one roller rotatably disposed thereto so as to be engaged with said notch such that when said brake cable is pulled, said movable element is moved and said roller pushes said first piston toward said bottom of said control portion.

3. The brake means as claimed in claim 1 wherein said disk has a groove defined in a periphery thereof for a seal received therein.

4. The brake means as claimed in claim 1 wherein said second piston has a protrusion extending from a second end thereof.

* * * * *